US008750826B2

(12) United States Patent
Bangor et al.

(10) Patent No.: US 8,750,826 B2
(45) Date of Patent: Jun. 10, 2014

(54) METHODS AND APPARATUS FOR ALTERNATIVE BILLING OF VOICE OVER INTERNET PROTOCOL (VOIP) SERVICES

(75) Inventors: Aaron Bangor, Austin, TX (US); Jeffrey Lee Brandt, Cedar Park, TX (US); Douglas F. Reynolds, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1469 days.

(21) Appl. No.: 11/624,561

(22) Filed: Jan. 18, 2007

(65) Prior Publication Data
US 2008/0175362 A1 Jul. 24, 2008

(51) Int. Cl.
*H04M 11/00* (2006.01)
*H04L 12/66* (2006.01)
*H04M 15/00* (2006.01)

(52) U.S. Cl.
USPC . 455/407; 455/408; 379/114.01; 379/114.21; 379/127.05; 370/352

(58) Field of Classification Search
None
See application file for complete search history.

(56) References Cited

U.S. PATENT DOCUMENTS

| 5,563,933 | A | 10/1996 | August et al. |
| 6,292,478 | B1 * | 9/2001 | Farris ............................. 370/352 |
| 6,330,315 | B1 | 12/2001 | Kapsales et al. |
| 6,570,970 | B2 | 5/2003 | Gruchala et al. |
| 6,741,687 | B1 * | 5/2004 | Coppage .................... 379/114.2 |
| 6,996,216 | B2 | 2/2006 | Brown et al. |
| 7,010,103 | B2 | 3/2006 | Donovan |
| 2002/0193093 | A1 * | 12/2002 | Henrikson et al. ............ 455/407 |
| 2003/0110039 | A1 * | 6/2003 | Brown et al. .................. 704/273 |
| 2004/0147245 | A1 * | 7/2004 | Kastelewicz et al. ......... 455/406 |
| 2005/0113073 | A1 * | 5/2005 | Bayne ............................ 455/413 |
| 2006/0176840 | A1 * | 8/2006 | Bloch et al. ................... 370/315 |
| 2007/0041535 | A1 * | 2/2007 | Forrest, II ................ 379/114.21 |
| 2007/0162334 | A1 * | 7/2007 | Altberg et al. ................... 705/14 |
| 2008/0153457 | A1 * | 6/2008 | Stura et al. .................... 455/406 |
| 2011/0092183 | A1 * | 4/2011 | Wieczorek .................... 455/406 |

* cited by examiner

*Primary Examiner* — Faruk Hamza
*Assistant Examiner* — Andrew Oh
(74) *Attorney, Agent, or Firm* — Hanley, Flight & Zimmerman, LLC (57) ABSTRACT

Methods and apparatus for alternative billing of VoIP services are disclosed. An example method comprises receiving an indication at a voice over Internet Protocol (VoIP) device that a call placed from the VoIP user device is blocked, and sending a VoIP protocol message containing billing information received at the VoIP user device to an alternative billing server. Another disclosed example method comprises determining at a VoIP call session control function (CSCF) server that a VoIP session is blocked, and providing a prompt at a VoIP user device to obtain billing information for the VoIP session.

29 Claims, 6 Drawing Sheets

METHODS AND APPARATUS FOR ALTERNATIVE BILLING OF VOICE OVER INTERNET PROTOCOL (VOIP) SERVICES

FIELD OF THE DISCLOSURE

This disclosure relates generally to voice over Internet protocol (VoIP) services and, more particularly, to methods and apparatus for alternative billing of VoIP services.

BACKGROUND

In communication systems, such as voice over Internet Protocol (VoIP) systems, calls may be restricted (e.g., blocked) based upon what telephone numbers are being called and/or based upon the location(s) from which calls are being initiated. Such restrictions may be used, for example, by a VoIP subscriber and/or VoIP service provider to reduce the occurrence of unauthorized calls. For example, a VoIP phone and/or VoIP service in a hotel lobby may be provisioned and/or configured to restrict long distance calls, and/or calls placed to international destinations and/or pay-per-use numbers (e.g., 900/976 telephone number).

DETAILED DESCRIPTION

Methods and apparatus for alternative billing of VoIP services are disclosed. A disclosed example method includes receiving an indication at a voice over Internet Protocol (VoIP) device that a call placed from the VoIP user device is blocked, and sending a VoIP protocol message containing billing information received at the VoIP user device to an alternative billing server. Another disclosed example method includes determining at a VoIP call session control function (CSCF) server that a VoIP session is blocked, and providing a prompt at a VoIP user device to obtain billing information for the VoIP session.

A disclosed example VoIP user device includes a network interface to receive an indication that an initiated voice over Internet protocol (VoIP) session is blocked and to send billing information to a billing server, and a billing agent to present a prompt for the billing information in response to the indication. A disclosed example apparatus includes a voice over Internet Protocol (VoIP) call processing server to receive a VoIP call initiation from a VoIP user device, and an alternative billing call server to receive a VoIP protocol message containing billing information from the VoIP user device.

Figure 1:
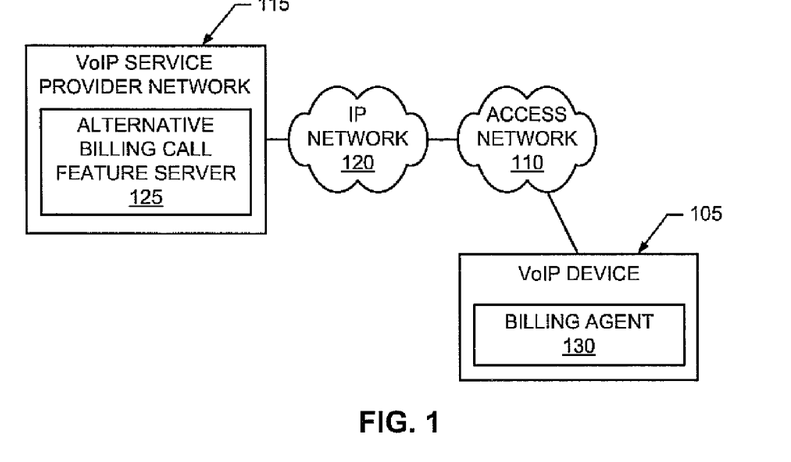
FIG. 1 is a schematic illustration of an example voice over Internet protocol (VoIP) communication system constructed in accordance with the teachings of the invention.

FIG. 1 is a schematic illustration of an example voice over Internet Protocol (VoIP) communication system that includes any number and/or type(s) of VoIP user devices, one of which is illustrated with reference number 105 in FIG. 1. Example VoIP user devices 105 include, but are not limited to, a VoIP phone, a VoIP residential gateway, a VoIP enabled personal computer (PC), a VoIP endpoint, a wireless VoIP user device (e.g., a wireless-fidelity (WiFi) Internet protocol (IP) phone), or a VoIP adapter (e.g., an analog telephone adapter (ATA)), and/or a VoIP kiosk. The example VoIP user device 105 of FIG. 1 may be implemented and/or found at any number and/or type(s) of locations. Examples of publicly accessible locations include, but are not limited to, a hotel, a motel, an airport, a retail location, an office, a restaurant, a school, a medical facility, etc. The VoIP user device 105 may also be located at private locations, such as an office building, a manufacturing location, a home, etc. Further, VoIP user devices 105 may be fixed location, substantially fixed location and/or mobile devices. Moreover, VoIP user devices 105 may have equipment communicatively and/or electrically coupled to them. For example, a VoIP ATA may have an attached telephone, and/or a VoIP residential gateway may have an attached personal computer and/or set-top box. An example manner of implementing the example VoIP user device 105 of FIG. 1 is described below in connection with FIG. 5.

To access VoIP communication services throughout and/or within a site, location, building, geographic area and/or geographic region, the example VoIP communication system of FIG. 1 includes any number and/or type(s) of access networks, one of which is illustrated in FIG. 1 with reference number 110. The example access network 110 of FIG. 1 can be implemented using any number and/or type(s) of past, present and/or future standards, specifications, communication devices, networks, technologies and/or systems, such as public switched telephone network (PSTN) systems, public land mobile network (PLMN) systems (e.g., cellular), wireless distribution systems, wired or cable distribution systems, coaxial cable distribution systems, Ultra High Frequency (UHF)/Very High Frequency (VHF) radio frequency systems, satellite or other extra-terrestrial systems, cellular distribution systems, power-line broadcast systems, fiber optic networks, and/or any combinations and/or hybrids of these devices, systems and/or networks.

To provide VoIP communication services (e.g., telephone services, Internet services, data services, messaging services, instant messaging services, electronic mail (email) services, chat services, video services, audio services, gaming services, etc.), the example VoIP communication system of FIG. 1 includes one or more VoIP service provider networks, one of which is illustrated in FIG. 1 with reference numeral 115. An example manner of implementing the example VoIP service provider network 115 of FIG. 1 is described below in connection with FIG. 2.

In the example VoIP communication system of FIG. 1, the VoIP user device 105 is communicatively coupled to the VoIP service provider network 115 via the access network 110 and any number and/or type(s) of private and/or public Internet protocol (IP) based communication networks 120 such as, for example, the Internet. In some examples, the VoIP user device 105 may be communicatively coupled to the access network 110 via one or more additional IP based networks and/or devices (not shown), such as a local area network (LAN), a gateway and/or a router located within a place of business, school and/or residence.

The example VoIP user device 105 of FIG. 1 is communicatively coupled to the example access network 110 via any number and/or type(s) of past, current and/or future communication network(s), communication system(s), communication device(s), transmission path(s), protocol(s), technique(s), specification(s) and/or standard(s). For instance, the example VoIP user device 105 may be coupled to the access network 110 via any type(s) of voice-band modem(s), digital subscriber line (DSL) modem(s), cable modem(s), Ethernet transceiver(s), optical transceiver(s), IP virtual private network (VPN) connection(s), Institute of Electrical and Electronics Engineers (IEEE) 802.11x (a.k.a. WiFi) transceiver(s), IEEE 802.16 (a.k.a. WiMax), wireless local area network (WLAN) access point(s), etc. Moreover, the example access network 110 and/or the example IP network 120 of FIG. 1 may extend geographically to include a location near to and/or encompassing one or more VoIP user device 105. For example, the access network 110 may include a wireless access point (not shown) by which, for example, a WiFi IP phone 100 connects to the IP network 120 and the VoIP service provider network 115.

In the example VoIP communication system of FIG. 1, the example access network 110, the IP network 120 and the VoIP service provider network 115 need not be owned, implemented, and/or operated by a single service provider. For example, the VoIP user device 105 may access VoIP services provided by a first VoIP service provider network 115 owned, operated and/or implemented by a first service provider via an access network 110 owned, operated and/or implemented by a second service provider. However, any or all of the access network 110, the VoIP service provider network 115 and/or the IP network 120 may be operated by a single service provider.

In the interest of brevity and clarity, throughout the following disclosure references will be made to the example VoIP communication system, the example VoIP service provider network 115 and/or the example VoIP user device 105 of FIG. 1. However, it should be understood that the methods and apparatus to provide alternative billing of VoIP services described herein are applicable to other examples and/or types of VoIP user devices, VoIP service provider networks and/or VoIP communication systems.

The example VoIP user device 105 and/or the example VoIP service provider network 115 of FIG. 1 may be configured and/or provisioned to block certain calls originating from and/or destined for the VoIP user device 105. For example, a publicly accessible VoIP phone 100 may be configured and/or provisioned such that, for example, international calls, pay-per-use calls and/or long distance calls cannot automatically be placed via the VoIP phone 100. However, while such blocking of calls protects against fraudulent use of the VoIP phone 100 and/or the VoIP service provider network 115, the owner and/or operator of the VoIP service provider network 115 has a missed revenue opportunity when such calls are blocked. For example, a person desiring to place such a call (i.e., a calling party) has to find another phone (VoIP or otherwise) from which to place the call. The methods and apparatus described herein facilitate, via and/or at the VoIP user device, the collection of alternative billing and/or payment information from the calling party such that the call can become unblocked and, thus, completed (i.e., a communication session established to the desired called party). Such alternative billing and/or payment information is used to charge the cost of the desired VoIP communication session to the calling party rather than an owner, operator and/or lessee of the VoIP phone (e.g., a hotel owner and/or a VoIP service provider). By facilitating the collection of alternative billing and/or payment information, all involved parties may be satisfied. In particular, the user can place the desired call, an establishment owner is not liable for unauthorized calls, and the VoIP service provider realizes increased revenue.

To prompt for and/or collect alternative billing and/or payment information, the example VoIP communication system of FIG. 1 includes an alternative billing server 125. The example alternative billing server 125 of FIG. 1 is implemented as a VoIP call feature server. However, other types of alternative billing servers 125 could be used. For example, U.S. Pat. No. 5,563,933, entitled "Method and Apparatus For Facilitating the Completing of Telephone Regional Toll-Free Calls From Outside The Region," and granted on Oct. 8, 1996; U.S. Pat. No. 6,330,315, entitled "Apparatus and Method for Routing Blocked Calls," and granted on Dec. 11, 2001; and U.S. Pat. No. 6,570,970, entitled "Calling-Party-Pays Call Processing For Cellular and Paging," and granted on May 27, 2003 describe other example manners of implementing the example alternative billing server 125 of FIG. 1. U.S. Pat. No. 5,563,933, U.S. Pat. No. 6,330,315 and U.S. Pat. No. 6,570,970 are each hereby incorporated by reference in their entirety. An example process that may be carried out to implement the example alternative billing call feature server 125 is described below in connection with FIG. 8.

When a blocked call is processed by, received at and/or detected at the VoIP service provider network 115 of FIG. 1, the example alternative billing call feature server 125 provides one or more prompts to and/or via the VoIP user device 105 to obtain alternative payment and/or billing information from a calling party (i.e., a current user of the VoIP user device 105 attempting to place the blocked call). When the alternative billing and/or payment information is verified, the alternative billing call feature server 125 unblocks the VoIP communication session (i.e., the VoIP service provider network 115 continues initiation of the desired VoIP communication session).

An example alternative billing call feature server 125 implements an interactive voice response system that provides one or more audible signals and/or messages that instruct and/or prompt the calling party to, for example, speak and/or press keys on the VoIP user device 105 (and/or an attached keypad or keyboard) to provide billing and/or payment information (e.g., a credit card number, a calling card number, and/or an account number) to the alternative billing call feature server 125. Another example alternative billing call feature server 125 provides one or more user interfaces (e.g., one or more web pages) that are displayed by and/or at the VoIP user device 105. Example user interfaces include, but are not limited to, one or more selectable and/or fillable items that the calling party can use to provide billing and/or payment information. For example, a text entry box may be provided for the calling party to enter a credit card number, a calling card number and/or an account number, and a button that causes the entered billing and/or payment information to be sent to the alternative billing call feature server 125. Such user interfaces may, additionally or alternatively, be displayed on a device that is communicatively and/or electrically coupled to the VoIP user device 105, for example, a personal computer and/or monitor. Yet another example alternative billing call feature server 125 determines whether the VoIP user device 105 is able to obtain the billing and/or payment information on behalf of the alternative billing call feature server 125 (e.g., the VoIP user device implements a billing agent 130). In such an example, the alternative billing call feature server 125 can notify the VoIP user device 105 that the call is blocked using, for example, a first data VoIP protocol message. As commonly used in the industry, the term "VoIP protocol message" is used herein to describe any type of message used to initiate, establish, configure, modify and/or tear-down a VoIP communication session. Example VoIP protocol messages are defined in accordance with one or more past, present and/or future specifications and/or standards that define a session initiation protocol (SIP) for VoIP communication systems. As such, VoIP protocol messages are distinct from data packets used to transport audio, video, text and/or images within a VoIP communication session.

The VoIP user device 105 prompts the calling party to obtain the billing and/or payment information, and then provides the billing and/or payment information to the alternative billing call feature server 125 via, for example, a second data VoIP protocol message. Example VoIP protocol messages include, but are not limited to, a SIP INFO and/or a SIP OPTIONS message. The alternative billing and/or payment information contained in such VoIP protocol messages may be encrypted for security purposes. An example data structure that may be used to implement an alternative billing and/or payment information VoIP protocol message and/or a blocked call VoIP protocol message is described below in connection with FIG. 4. Persons of ordinary skill in the art will readily appreciate that an alternative billing call feature server 125 may implement any or all of these methods and/or apparatus to obtain alternative billing and/or payment information.

To obtain alternative billing and/or payment information on behalf of the example alternative billing call feature server 125, the example VoIP user device 105 of FIG. 1 includes the billing agent 130. However, a VoIP user device 105 need not include the billing agent 130. When notified by the alternative billing call feature server 125 (and/or any other alternative billing server), the example billing agent 130 of FIG. 1 presents one or more prompts to a user of the VoIP user device 105 to obtain alternative payment and/or billing information.

An example billing agent 130 implements an interactive voice response system that provides one or more audible messages and/or signals that instruct and/or prompt the calling party to, for example, speak and/or press keys on the VoIP user device 105 (and/or an attached keypad or keyboard) to provide billing and/or payment information (e.g., a credit card number, a calling card number, and/or an account number) to the billing agent 130. Another example alternative billing agent 130 displays one or more user interfaces (e.g., one or more web pages, text messages, etc.) at the VoIP user device 105 that prompt the user to enter and/or provide the alternative billing and/or payment information. Example user interfaces include, but are not limited to, one or more selectable and/or fillable items that the user uses to provide the alternative billing and/or payment information. For example, a text entry box may be provided for the calling party to enter a credit card number, a calling card number, an account number and/or an account number for a separate entity than the entity providing the VoIP communication services (e.g., a different utility provider), and a button that completes entry of the billing and/or payment information. Such user interfaces may, additionally or alternatively, be displayed on a device that is communicatively and/or electrically coupled to the VoIP user device 105, for example, a personal computer and/or monitor. Persons of ordinary skill in the art will readily appreciate that a billing agent 130 may implement any or all of these methods and/or apparatus to obtain alternative billing and/or payment information.

Once alternative billing and/or payment information is obtained at the example billing agent 130 of FIG. 1, the billing agent 130 provides the obtained billing and/or payment information to the alternative billing call feature server 125 via, for example, a VoIP protocol message. Example VoIP protocol messages include a SIP INFO and/or a SIP OPTIONS message. The alternative billing and/or payment information contained in such VoIP protocol messages may be encrypted for security purposes. An example data structure that may be used to implement an alternative billing and/or payment information VoIP protocol message is described below in connection with FIG. 4.

While an example VoIP communication system, an example VoIP user device 105 and an example VoIP service provider network 115 have been illustrated in FIG. 1, the devices, networks, systems, and/or processors illustrated in FIG. 1 may be combined, divided, re-arranged, eliminated and/or implemented in any of a variety of ways. Further, the example alternative billing call feature server 125, the example billing agent 130 and/or, more generally, the example VoIP service provider network 115 and the example VoIP user device 105 may be implemented by hardware, software, firmware and/or any combination of hardware, software and/or firmware. Further still, the example VoIP communication system, the example VoIP user device 105 and the example VoIP service provider network 115 may include additional servers, systems, networks, gateways, portals, and/or processors than those illustrated in FIG. 1 and/or may include more than one of any or all of the illustrated devices, servers, networks, systems, gateways, portals, and/or processors. For example, a VoIP communication system may include any number and/or type(s) of VoIP user devices 105, and/or any number and/or type(s) of access networks 110, VoIP service provider networks 115 and/or IP networks 120. Additionally or alternatively, the VoIP service provider network 115 may include one or more additional call feature servers and/or application servers (not shown) that provide additional service features to subscribers (e.g., voicemail, call trees, etc.).

Figure 2:
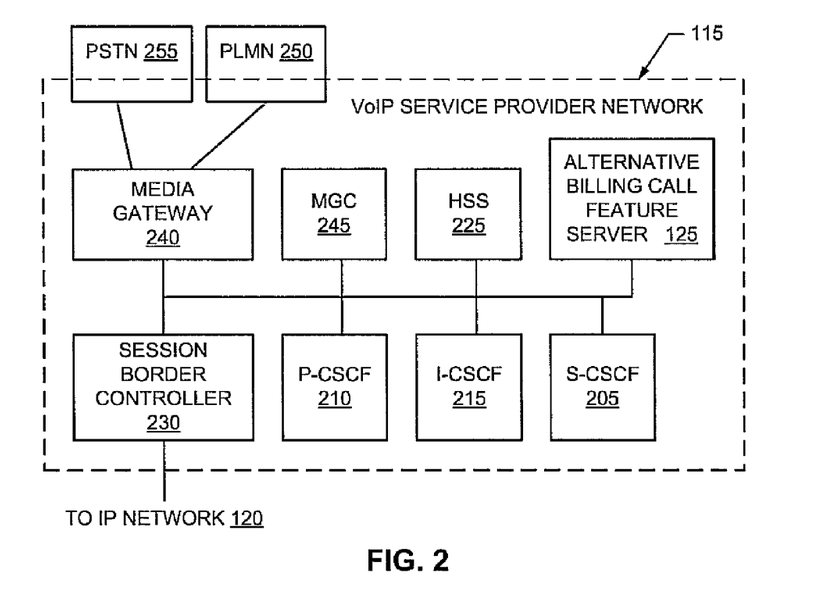
FIG. 2 illustrates an example manner of implementing the example VoIP service provider network of FIG. 1.

FIG. 2 illustrates an example manner of implementing the example VoIP service provider network 115 of FIG. 1. In the illustrated example VoIP communication system of FIG. 1, each VoIP user device (e.g., the example VoIP user device 105) is registered to, associated with and/or assigned to a serving call session control function (S-CSCF) server 205 responsible for handling incoming and/or outgoing VoIP communication sessions (e.g., telephone calls and/or video sessions) associated with its registered VoIP user devices 105. That is, an S-CSCF 205 performs session control, maintains session state and/or enables communication with call feature servers for its associated and/or registered VoIP user devices 105. For instance, for a VoIP user device 105 initiating an outgoing telephone call, a SIP INVITE message is routed by the VoIP service provider network 115 to its associated S-CSCF 205 which, in turn, routes and/or assists in establishing a VoIP communication path and/or VoIP communication session (e.g., a telephone call) with a called device (i.e., a called party). Likewise, a VoIP user device 105 receiving an incoming communication session receives a SIP INVITE message via its associated S-CSCF 205. While a single S-CSCF 205 is illustrated in FIG. 2, the VoIP service provider network 115 may include any number and/or type(s) of S-CSCF servers that each support any number and/or type(s) of VoIP user devices 105.

To provide an access entry point for a VoIP user device 105 into the VoIP service provider network 115 and/or, more specifically, to the S-CSCF 205 to which it is registered and/or to be registered, the example VoIP service provider network 115 of FIG. 2 includes any number and/or type(s) of proxy call session control function (P-CSCF) servers, one of which is illustrated in FIG. 2 with reference number 210. The example P-CSCF 210 of FIG. 2, among other things, routes SIP messages between a VoIP user device 105 and its S-CSCF 205.

To locate the S-CSCF 205 associated with a VoIP user device 105, the example VoIP service provider network 115 of FIG. 2 includes any number and/or type(s) of interrogating call session control function (I-CSCF) servers, one of which is illustrated in FIG. 2 with reference number 215. The example I-CSCF 215 of FIG. 2 serves as a contact point within the example VoIP service provider network 115 for all connections destined for a VoIP user device 105 of the VoIP communication system and/or for a VoIP user device 105 currently located within the serving area of the VoIP communication system (e.g., a roaming subscriber). For example, for an incoming communication session (e.g., a telephone call), the example I-CSCF 215 identifies which S-CSCF 205 to which the destination VoIP user device 105 is registered. Based upon the S-CSCF 205 identified by the I-CSCF 215, the P-CSCF 210 routes VoIP protocol messages between the VoIP user device 105 and its S-CSCF 205.

To manage subscriber information and/or to enable subscribers and/or servers to locate destinations, the example VoIP service provider network 115 of FIG. 2 includes any number and/or type(s) of home subscriber server(s) (HSSs), one of which is illustrated in FIG. 2 with reference numeral 225. The example HSS 225 of FIG. 2 maintains a profile and/or one or more preferences for each subscriber and/or VoIP user device 105 of the VoIP service provider network 115. The example I-CSCF 215 of FIG. 2 uses information contained in the HSS 225 to determine and/or locate the S-CSCF 205 associated with a particular subscriber and/or VoIP user device 105. The example HSS 225 can also be used to store blocked numbers for a subscriber and/or a VoIP user device 105. For example, when a call is initiated by a VoIP user device 105, the I-CSCF 215 and/or the S-CSCF 205 associated with the VoIP user device can query the HSS 225 to determine if the called party is associated with a blocked destination and/or phone number.

To implement border and/or gateway functions, the example VoIP service provider network 115 of FIG. 2 includes any number and/or type(s) of session border controllers, one of which is illustrated in FIG. 2 with reference numeral 230. The example session border controller 230 of FIG. 2 is implemented in accordance with the Alliance for Telecommunications Industry Solutions (ATIS)/Telecoms & Internet converged Services & Protocols for Advanced Networks (TISPAN) for Next Generation Networks (NGN). The example session border controller 230 may, in some instances, exert control over the signaling and/or media streams involved in setting up, conducting, and/or tearing down calls by, for example, modifying signaling (e.g., resolving between different VoIP signal protocols), modifying VoIP protocol messages and/or modifying media streams (e.g., transcoding) passing between calling and/or called parties. By configuring and/or provisioning the session border controller 230, a VoIP service provider can control the kinds of call that can be placed through their VoIP service provider network 115.

To process and/or handle communication service data between a VoIP user device 105 and a public land mobile network (PLMN) 250 (e.g., a cellular communication network) and/or a public switched telephone network (PSTN) 255, the example VoIP service provider network 115 of FIG. 2 includes any number and/or type(s) of media gateways, one of which is illustrated in FIG. 2 with reference number 240. Using any number and/or type(s) of technique(s), method(s) and/or algorithm(s), the media gateway 240 of FIG. 2 performs any necessary media data conversion between, for example, a circuit-based transmission format used by the PSTN 255 and a packet-based format and/or data structure used by the VoIP service provider network 115, the IP network 120, and/or the VoIP user device 105.

To control the example media gateway 240, the example VoIP service provider network 115 of FIG. 2 includes any number and/or type(s) of media gateway controllers (MGC), one of which is illustrated in FIG. 2 with reference number 245. Using any number and/or type(s) of technique(s), method(s) and/or in accordance with any past, present and/or future specification(s) and/or standard(s) such as, for example, Internet Engineering Task Force (IETF) Request for Comment (RFC) 3015 and/or the International Telecommunications Union (ITU) H.248 standard, the example MGC 245 of FIG. 2 performs signaling, session control and/or session management for incoming and/or outgoing VoIP communication sessions that originate in and/or terminate in, for example, the example PLMN 250 and/or the PSTN 255.

As illustrated in FIG. 2, the example VoIP service provider network 115 may include an interface to and/or contain a portion of the PLMN 250, an interface to and/or contain a portion of the PSTN 255, and/or an interface to and/or contain a portion of any number and/or type(s) of additional communication networks. For example, using any number and/or type(s) of technique(s), method(s), protocol(s) and/or technology(-ies), the media gateway 240, the MGC 245 and the PSTN 255 can facilitate telephone calls between a PSTN-based phone (not shown) and the example VoIP user devices 105

The example PLMN 250 and/or the example PSTN 255 of FIG. 2 may be implemented by any number and/or type(s) of communication devices, switches, protocols, systems and/or technologies. For instance, the example PLMN 250 may include any number of cellular base stations that can transmit cellular signals to and/or receive cellular signals from a cellular communication device (not shown) using any type(s) of protocols (e.g., time-division multiple access (TDMA), code-division multiple access (CDMA), orthogonal frequency-division multiple access (OFDM), Global System for Mobile Communications (GSM), etc.). In some examples, an interface between the MGC 240 and the PLMN 250 is implemented via the PSTN 255.

To prompt for and collect alternative billing and/or payment information for blocked VoIP communication sessions, the example VoIP service provider network 115 of FIG. 2 includes an alternative billing server 125. The example alternative billing server 125 of FIG. 2 is implemented as a VoIP call feature server and/or application server. However, as described above, other types of alternative billing servers 125 could be used. An example manner of implementing the example alternative billing server 125 of FIG. 2 is described below in connection with FIG. 3.

When a blocked call is processed by, received at and/or detected by the VoIP service provider network 115 of FIG. 2

(e.g., by a I-CSCF 215 and/or a S-CSCF 205 based upon the HSS 225), the example alternative billing call feature server 125 of FIG. 2 provides one or more prompts to and/or via the VoIP user device (e.g., the example VoIP user device 105 of FIG. 1) to obtain payment and/or billing information from a calling party (i.e., a current user of the VoIP user device 105 attempting to place the blocked call).

An example alternative billing call feature server 125 implements an interactive voice response system that provides one or more audible messages and/or signals that instruct and/or prompt the calling party to, for example, speak and/or press keys on the VoIP user device 105 (and/or an attached keypad or keyboard) to provide alternative billing and/or payment information (e.g., a credit card number, a calling card number, and/or an account number) to the alternative billing call feature server 125. Another example alternative billing call feature server 125 provides one or more user interfaces (e.g., one or more web pages and/or text messages) that are display by and/or at the VoIP user device 105. Example user interfaces include, but are not limited to, one or more selectable and/or fillable items for the calling party to use to provide the alternative billing and/or payment information. For example, a text entry box may be provided that the calling party uses to enter a credit card number, a calling card number, an account number and/or allows the user to speak with an operator to provide the billing information, and a button that sends the entered billing and/or payment information to the alternative billing call feature server 125. Such user interfaces may, additionally or alternatively, be displayed on a device that is communicatively and/or electrically coupled to the VoIP user device 105, for example, a personal computer and/or monitor. Yet another example alternative billing call feature server 125 detects if the VoIP user device 105 is able to obtain the billing and/or payment information on behalf of the alternative billing call feature server 125 (e.g., contains the example billing agent 130 of FIG. 1). In such an example, the alternative billing call feature server 125 notifies the VoIP user device 105 that the call is blocked via a first VoIP protocol message. The VoIP user device 105 prompts the calling party to obtain the billing and/or payment information, and then provides the billing and/or payment information to the alternative billing call feature server 125 via, for example, a second VoIP protocol message. Example VoIP protocol messages include a SIP INFO and/or a SIP OPTIONS message. The alternative billing and/or payment information contained in such VoIP protocol messages may be encrypted for security purposes. An example data structure that may be used to implement an alternative billing and/or payment information VoIP protocol message and/or a blocked call notification VoIP protocol message is described below in connection with FIG. 4. Persons of ordinary skill in the art will readily appreciate that an alternative billing call feature server 125 may implement any or all of these methods and/or apparatus to obtain alternative billing and/or payment information.

It will be readily appreciated by persons of ordinary skill in the art that the example alternative billing call feature server 125, the example S-CSCF 205, the example P-CSCF 210, the example I-CSCF 215, the example HSS 225, the example session border controller 230, the example media gateway 240 and the example MGC 245 illustrated in FIG. 2 are logical entities of the example VoIP service provider network 115. They may be implemented, for example, as machine accessible instructions executed by one or more computing devices and/or computing platforms. Further, while an example VoIP service provider network 115 has been illustrated in FIG. 2, the example logical entities of the VoIP service provider network 115 may be combined, split, rearranged, eliminated and/or implemented in any of a variety of ways. Further still, the example alternative billing call feature server 125, the example S-CSCF 205, the example P-CSCF 210, the example I-CSCF 215, the example HSS 225, the example session border controller 230, the example media gateway 240 and the example MGC 245 and/or, more generally, the example VoIP service provider network 115 may be implemented by hardware, software, firmware and/or any combination of hardware, software and/or firmware. Moreover, a VoIP service provider network 115 may include additional logical entities and/or may include more than one of any of the illustrated logical entities. For example, one or more call features servers and/or application servers (not shown) can be included to provide additional service features to subscribers (e.g., voicemail, call trees, etc.).

Figure 3:
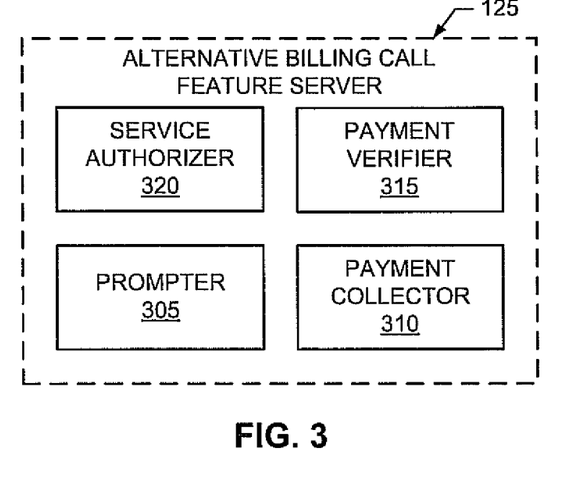
FIG. 3 illustrates an example manner of implementing any or all of the example alternative billing call feature servers of FIGS. 1 and 2.

FIG. 3 illustrates an example manner of implementing any or all of the example alternative bill call servers 125 of FIGS. 1 and 2. To prompt for alternative billing and/or payment information for blocked VoIP communication sessions, the example alternative billing call feature server 125 of FIG. 3 includes a prompter 305. The example prompter 305 of FIG. 3 provides one or more prompts to and/or via the VoIP user device (e.g., the example VoIP user device 105 of FIG. 1) to obtain alternative payment and/or billing information from a calling party (i.e., a current user of the VoIP user device 105 attempting to place the blocked call).

An example prompter 305 implements an interactive voice response system that provides one or more audible messages and/or signals that instruct and/or prompt the calling party to, for example, speak and/or press keys on the VoIP user device 105 (and/or an attached keypad or keyboard) to provide alternative billing and/or payment information (e.g., a credit card number, a calling card number, and/or an account number). Another example prompter 305 provides one or more user interfaces (e.g., one or more web pages and/or text displays) that are display by and/or at the VoIP user device 105. Example user interfaces include, but are not limited to, one or more selectable and/or fillable items for the calling party to use to provide the alternative billing and/or payment information. For example, a text entry box may be provided for the calling party to enter a credit card number, a calling card number and/or an account number, and a button that sends the entered billing and/or payment information to the alternative billing call feature server 125. Such user interfaces may, additionally or alternatively, be displayed on a device that is communicatively and/or electrically coupled to the VoIP user device 105, for example, a personal computer and/or monitor. Yet another example prompter 305 detects if the VoIP user device 105 is able to obtain the billing and/or payment information on behalf of the alternative billing call feature server 125 (e.g., includes the example billing agent 130 of FIG. 1). In such an example, the prompter 305 notifies the VoIP user device 105 that the call is blocked via a first VoIP protocol message. The VoIP user device 105 prompts the calling party to obtain the alternative billing and/or payment information and sends the billing and/or payment information to the alternative billing call feature server 125 via a second VoIP protocol message. Persons of ordinary skill in the art will readily appreciate that prompter 305 may implement any or all of these methods and/or apparatus to prompt a calling party for alternative billing and/or payment information.

To receive alternative billing and/or payment information from and/or via the VoIP user device 105, the example alternative billing call feature server 125 of FIG. 3 includes a payment collector 310. The example payment collector 310 of FIG. 3 can receive and/or obtain alternative billing and/or payment information via one or more different methods. In an example method, the payment collector 310 obtains the alternative billing and/or payment information via an interactive voice response system. In another example, the payment collector 310 obtains the alternative billing and/or payment information via one more values entered via one or more user interfaces provided by the example prompter 305. In yet another example, payment collector 310 receives the alternative billing and/or payment information in a VoIP protocol message sent by the VoIP user device 105. Example VoIP protocol messages include, for example, a SIP INFO and/or a SIP OPTIONS message. The billing and/or payment information contained in such VoIP protocol messages may be encrypted for security purposes. An example data structure that may be used to implement an alternative billing and/or payment information VoIP protocol message is described below in connection with FIG. 4. Persons of ordinary skill in the art will readily appreciate that payment collector 310 may implement any or all of these methods and/or apparatus to obtain alternative billing and/or payment information.

To verify alternative billing and/or payment information, the example alternative billing call feature server 125 of FIG. 3 includes a payment verifier 315. Using any algorithm(s), method(s), rule(s), server(s) and/or databases(s), the example payment verifier 315 of FIG. 3 verifies alternative billing and/or payment information. For example, the payment verifier 315 processes received credit card information by sending the credit card number, expiration date and security code to a credit card processing server (not shown). In another example, the payment verifier 315 processes an account number by sending the account number and personal identification number (PIN) to a billing server (not shown) that verifies that the calling party is authorized to bill VoIP communication services to the account.

To process and/or control the handling of blocked VoIP communication sessions, the example alternative billing call feature server 125 of FIG. 3 includes a service authorizer 320. The example service authorizer 320 of FIG. 3 receives notifications from S-CSCF servers (e.g., the example S-CSCF 205 of FIG. 2) of a request to initiate a VoIP communication session to a blocked called party. Upon receipt of such notifications, the service authorizer 320 directs the example prompter 305 to prompt the calling party for alternative billing and/or payment information, and directs the payment collector 310 and the payment verifier 315 to obtain and verify the alternative billing and/or payment information. When verified alternative billing and/or payment information is received, the example service authorizer 320 notifies the S-CSCF that the VoIP communication session is unblocked and, thus, authorized to be established.

While an example alternative billing call feature server 125 is illustrated in FIG. 3, the example server alternative billing call feature server 125 may be implemented using any number and/or type(s) of other and/or additional logic, processors, devices, components, circuits, modules, interfaces, etc. Further, the logic, processors, devices, components, circuits, modules, elements, interfaces, etc. illustrated in FIG. 3 may be combined, divided, re-arranged, eliminated and/or implemented in any of a variety of ways. Additionally, the example alternative billing call feature server 125 may be implemented as any combination of firmware, software, logic and/or hardware. For example, the example prompter 305, the example payment collector 310, the example payment verifier 315, the example service authorizer 320 and/or, more generally, the example alternative billing call feature server 125 may be implemented as coded instructions (e.g., the example coded instructions 910 and/or 912 of FIG. 9) executed by, for example, the example processor 905 of FIG. 9. Moreover, an alternative billing call feature server 125 may include additional logic, processors, devices, components, circuits, interfaces and/or modules than those illustrated in FIG. 3 and/or may include more than one of any or all of the illustrated processors, devices, components, circuits, interfaces and/or modules.

Figure 4:
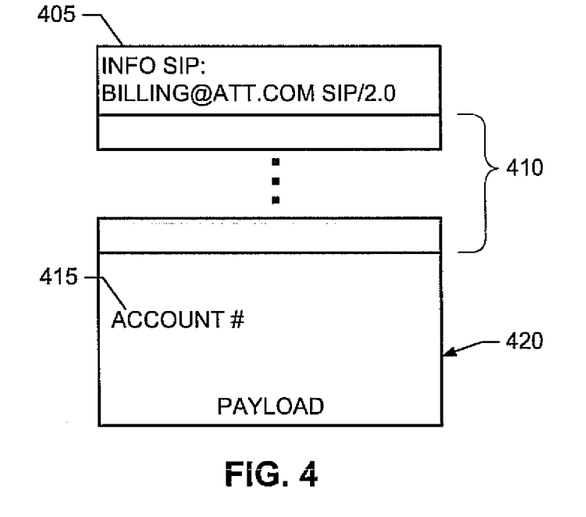
FIG. 4 illustrates an example data structure that may be used to implement an alternative billing and/or payment information VoIP protocol message and/or a blocked call notification VoIP protocol message.

FIG. 4 illustrates an example data structure that may be used to implement an alternative billing and/or payment VoIP protocol message and/or a block call notification VoIP protocol message. The example data structure of FIG. 4 is constructed in accordance with a VoIP protocol message, such as a SIP INFO and/or a SIP OPTIONS message. However, any type of data structure may be used to transmit alternative billing and/or payment information and/or notify a VoIP user device 105 of a block VoIP communication session.

To identify the SIP message, the example data structure of FIG. 4 includes a name field 405. The example name field 405 of FIG. 4 includes an alphanumeric string that identifies the SIP message and identifies a destination for the example message. The example SIP message illustrated in FIG. 4 is a SIP INFO message and, thus, the example name field 405 contains a string that includes "INFO SIP:". Such a SIP message may be sent to, for example, provide alternative billing and/or payment information and/or notify a VoIP user device of a blocked call. In the illustrated example data structure, the SIP message is addressed to billing@att.com, where billing@att.com is a SIP uniform resource identifier (URI) for an alternative billing server (e.g., any of the example alternative billing call feature servers 125 of FIGS. 1-3). Persons of ordinary skill in the art will readily recognize that the name field 405 could be used to identify other types of SIP messages to other destinations.

To provide additional values and/or parameters, the example data structure of FIG. 4 includes one or more header fields 410. Example header fields 410 include, but are not limited to, a from field, a caller identification field, a command sequence number field, and/or payload length field. The number of header fields 410, in some examples, depends upon the type of SIP message and/or the protocol(s) implemented by either endpoint.

To convey and/or carry any number and/or type(s) of additional data and/or information, such as alternative billing and/or payment information 415, the example data structure of FIG. 4 includes a payload 420. In some examples, the alternative billing and/or payment information 415 is encrypted before being placed into the payload 420 of the example data structure. For a blocked call notification VoIP protocol message, the billing and payment information 415 is replaced with an alphanumeric string (e.g., "CALL BLOCKED") that signifies that the requested VoIP communication session is blocked unless alternative billing and/or payment information is provided by the calling party.

While an example data structure is illustrated in FIG. 4, the example data structure may be implemented using any number and/or type(s) of other and/or additional fields and/or data. Further, the fields and/or data illustrated in FIG. 4 may be combined, divided, re-arranged, eliminated and/or implemented in any of a variety of ways. Moreover, the example data structure may include additional fields and/or data than those illustrated in FIG. 4 and/or may include more than one of any or all of the illustrated fields and/or data.

Figure 5:
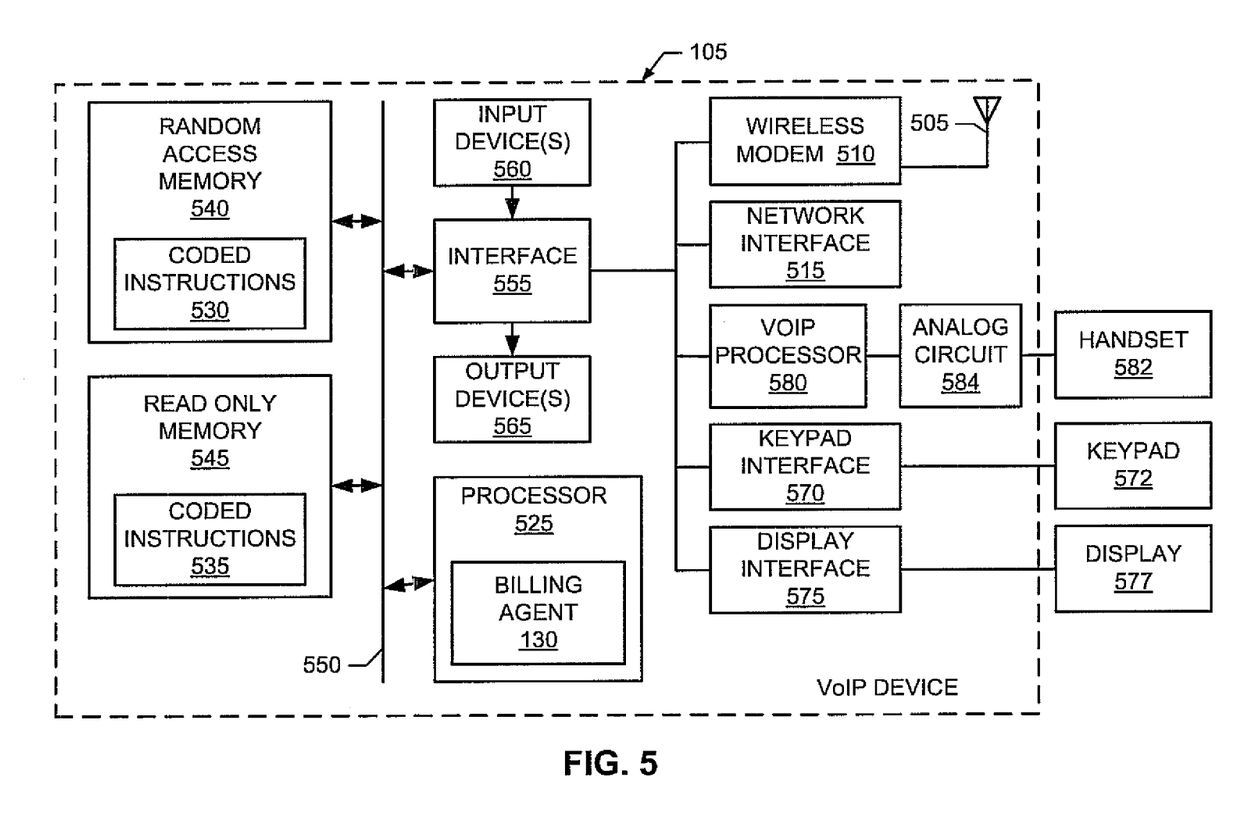
FIG. 5 illustrates an example manner of implementing the example VoIP user device of FIG. 1.

FIG. 5 illustrates an example manner of implementing the example VoIP user device 105 of FIG. 1. To implement wireless communications with, for example an access network (e.g., the example access network 110 of FIG. 1), another device (e.g., a personal computer), network (e.g., a local area network (LAN), a modem, a router, a bridge and/or a gateway), a WLAN and/or PLMN, the example VoIP user device 105 of FIG. 5 includes any number and/or type(s) of radio frequency (RF) antennas 505 and any number and/or type(s) of wireless modems 510. The example RF antenna 505 and the example wireless modem 510 of FIG. 5 are able to receive, demodulate and decode cellular (e.g., 3G), WLAN, WiFi and/or WiMax signals transmitted by and/or within a WLAN and/or PLMN. Likewise, the wireless modem 510 and the RF antenna 505 are able to encode, modulate and transmit cellular (e.g., 3G), WLAN, WiFi and/or WiMax signals to and/or within a WLAN and/or PLMN. Thus, as commonly referred to in the industry, the example RF antenna 505 and the example wireless modem 510 collectively implement the physical layer (a.k.a. PHY) for the example VoIP user device 105 of FIG. 5. However, a VoIP user device 105 need not include a wireless PHY.

To communicatively couple the example VoIP user device 105 of FIG. 5 to an access network (e.g., the example access network 110 of FIG. 1), another device (e.g., a personal computer) and/or network (e.g., a local area network (LAN), a modem, a router, a bridge and/or a gateway), the example VoIP user device 105 of FIG. 5 includes any number and/or type(s) of network interfaces 515. However, a VoIP user device 105 need not include a network interface 515. The example network interface 515 of FIG. 5 operates in accordance with any of the IEEE 802.3x (a.k.a. Ethernet) family of standards. The example VoIP user device 105 of FIG. 5 may also include any other type of communication interface(s), such as any type of voice-band modem(s), DSL modem(s), cable modem(s), Ethernet transceiver(s), optical transceiver(s), IP VPN connection(s), IEEE 802.11x (a.k.a. WiFi) transceiver(s), IEEE 802.16 (a.k.a. WiMax) transceiver(s), etc. The example network interface 505 includes one or more transmission control protocol (TCP)/IP stacks. However, TCP/IP stacks may, additionally or alternatively, be implemented as a part of a device operating system and/or as a part of interface firmware and/or any combination thereof.

The example PHY (e.g., the example wireless modem 510 and the example antenna 505) and/or the example network interface 515 of FIG. 5 can be used to communicatively couple the VoIP user device 105 and/or, more generally, an VoIP user device 105 to the VoIP network service provider network 115 via the access network 110 (FIG. 1). Which of the PHY and/or the network interface 515 are used to connect to a particular access network 110 depends upon the type(s) of access networks 110 available to the VoIP user device 105 and/or depends upon the selection of a specific access network 110 and/or a specific operator of access networks 110.

To prompt for and/or to obtain alternative billing and/or payment information on behalf of an alternative billing server (e.g., any of the example alternative billing servers 115 of FIGS. 1-3), the example VoIP user device 105 of FIG. 5 includes a billing agent 130. When directed by an alternative billing server (e.g., any or all of the example alternative billing servers 125 of FIGS. 1-3), the example billing agent 130 of FIG. 5 presents and/or provides one or more prompts to a user of the VoIP user device 105 to obtain alternative payment and/or billing information. An example billing agent 130 implements an interactive voice response system that provides one or more audible messages and/or signals via, for example, a handset 582, that instruct and/or prompt a user of the VoIP user device 105 to, for example, speak and/or press keys of the VoIP user device 105 (e.g., a keypad 572) to provide the alternative billing and/or payment information (e.g., a credit card number, a calling card number, and/or an account number) to the billing agent 130. Another example alternative billing agent 130 displays one or more user interfaces (e.g., one or more web pages and/or text displays) on a display 577 of the VoIP user device 105 that prompt for the alternative billing and/or payment information. Example user interfaces include, but are not limited to, one or more selectable and/or fillable items that the user uses to provide billing and/or payment information. For example, a text entry box may be provided for the calling party to enter a credit card number, a calling card number and/or an account number, and a button that sends the entered billing and/or payment information to the billing agent 130. Such user interfaces may, additionally or alternatively, be displayed on a device that is communicatively and/or electrically coupled to the VoIP user device 105, for example, a personal computer and/or monitor.

Once such alternative billing and/or payment information is obtained at the example billing agent 130 of FIG. 5, the billing agent 130 provides the obtained billing and/or payment information to the alternative billing call feature server via, for example, a VoIP protocol message. Example VoIP protocol messages include, but are not limited to, a SIP INFO and/or a SIP OPTIONS message. The billing and/or payment information contained in such VoIP protocol messages may be encrypted for security purposes. An example data structure that may be used to implement an alternative billing and/or payment information VoIP protocol message is described above in connection with FIG. 4. Persons of ordinary skill in the art will readily appreciate that a billing agent 130 may implement any or all of these methods and/or apparatus to obtain and send alternative billing and/or payment information.

To implement the example billing agent 130 of FIG. 5 using one or more of any number and/or type(s) of software, firmware, processing thread(s) and/or subroutine(s), the example VoIP user device 105 includes a processor 525. The example processor 525 of FIG. 5 may be and/or include one or more of any type(s) of processors such as, for example, a microprocessor, a processor core, a microcontroller, a digital signal processor (DSP), an advanced reduced instruction set computing (RISC) machine (ARM) processor, etc. The example processor 525 executes coded instructions 530 and/or 535 which may be present in a main memory of FIG. 5 (e.g., within a random-access memory (RAM) 540 and/or a read-only memory (ROM) 545) and/or within an on-board memory of the processor 525. The example processor 525 may carry out, among other things, the example process illustrated in FIG. 7 to implement the example billing agent 130.

While in the illustrated example of FIG. 5, the example billing agent 130 is implemented by executing one or more type(s) of software, firmware, processing thread(s) and/or subroutine(s) with the example processor 525, the example billing agent 130 of FIG. 5 may be, additionally or alternatively, implemented using any number and/or type(s) of application specific integrated circuit(s) (ASIC(s)), programmable logic device(s) (PLD(s)), field programmable logic device(s) (FPLD(s)), discrete logic, hardware, firmware, etc. Also, some or all of the example billing agent 130 may be implemented manually or as any combination of any of the foregoing techniques. For example, the billing agent 130 may be implemented by any combination of firmware, software and/or hardware.

The example processor 525 of FIG. 5 is in communication with the main memory (e.g., the RAM 540 and/or the ROM 545) via a bus 550. The example RAM 540 may be implemented by DRAM, SDRAM, and/or any other type of RAM device. The example ROM 545 may be implemented by flash memory and/or any other desired type of memory device.

Access to the memories 540 and 545 is controlled by a memory controller (not shown). The RAM 540 may be used, for example, to store one or more thresholds which are used to determine whether and/or when to perform background scanning.

The example VoIP user device 105 of FIG. 5 also includes any number and/or type(s) of interface circuits 555. The example interface circuit 555 of FIG. 5 may implement any number and/or type(s) of interfaces, such as external memory interface(s), serial port(s), general purpose input/output port(s), etc. Additionally or alternatively, the interface circuit 555 may communicatively couple the example wireless modem 510 and/or the network interface 515 with the processor 525 and/or the example billing agent 130.

In the example of FIG. 5, any number and/or type(s) of input devices 560 and any number and/or type(s) of output devices 565 are connected to the interface circuit 555. To facilitate user inputs via a keypad (e.g., the example keypad 150 of FIGS. 1 and/or 3), the example VoIP user device 105 of FIG. 5 includes any type of keypad interface 570. The example keypad interface 570 of FIG. 5 electrically couples and/or translates electrical signals conveying key press information from any keypad, keyboard and/or buttons 572 to the example processor 525 and/or the example billing agent 130. An example keypad includes four (4) rows with three (3) keys per row. Additionally or alternatively, the processor 525 can receive key press information from a device communicatively coupled to the VoIP user device 105 (e.g., a personal computer communicatively coupled to the VoIP user device 105 via the network interface 515).

To provide output information to a user via a display 577, the example VoIP user device 105 of FIG. 5 includes any number and/or type(s) of display interfaces 575. An example display interface 575 receives information (e.g., video, web page, email, text message, alphanumeric characters, etc.) to be displayed from the example processor 525 and/or the billing agent 130 and creates electrical signals suitable for displaying the information on the example display 577.

To implement voice over IP (VoIP) services, the example VoIP user device 105 of FIG. 5 includes a VoIP processor 580. The example VoIP processor 580 of FIG. 5 implements, among other things, session control, VoIP protocols, a SIP user agent, and a coder (not shown) to encode audio and/or video signals, a decoder (not shown) to decode received audio and/or video signals, a packetizer (not shown) to packetize encoded data and a de-packetizer (not shown) to de-packetize encoded data.

To electrically couple signals (e.g., speech signals) between the handset 582 and the example VoIP processor 580, the example VoIP user device 105 of FIG. 5 includes any number and/or type(s) of analog circuits 584. An example analog circuit 584 includes any number and/or type(s) of filter(s), analog-to-digital converter(s) and/or digital-to-analog converter(s) to convert between analog signals sent to and/or received from an example handset 582 and digital signals sent to and/or received from the example VoIP processor 580.

To this end, the example analog circuit 584 of FIG. 5 may implement any number and/or type(s) of wireless communication technologies to communicatively couple the example VoIP processor 580 with any type of cordless handset 582. Moreover, the example analog circuit 584 of FIG. 5 may, additionally or alternatively, implement any number and/or type(s) of subscriber line interface circuits (SLICs) that allow any number and/or type(s) of corded and/or cordless PSTN-based telephones (not shown) to be electrically coupled to the example VoIP processor 580 of FIG. 5. The latter example could be used, for instance, in implementations where the example VoIP user device 105 is located in and/or implements a VoIP analog telephone adapter (ATA) and/or a VoIP residential gateway.

While an example manner of implementing the example VoIP user device 105 of FIG. 1 is illustrated in FIG. 5, a VoIP user device 105 may be implemented using any number and/or type(s) of other and/or additional element(s), processor(s), device(s), component(s), circuit(s), module(s), interface(s), etc. Further, the element(s), processor(s), device(s), component(s), circuit(s), module(s), element(s), interface(s), etc. illustrated in FIG. 5 may be combined, divided, re-arranged, eliminated and/or implemented in other ways. Additionally, the example wireless modem 510, the example network interface 515, the example billing agent 130, the example VoIP processor 580 and/or, more generally, the example VoIP user device 105 of FIG. 5 may be implemented as any combination of firmware, software, logic and/or hardware. Moreover, the example VoIP user device 105 may include additional processor(s), device(s), component(s), circuit(s), interface(s) and/or module(s) than those illustrated in FIG. 5 and/or may include more than one of any or all of the illustrated processor(s), device(s), component(s), circuit(s), interface(s) and/or module(s).

Figure 6:
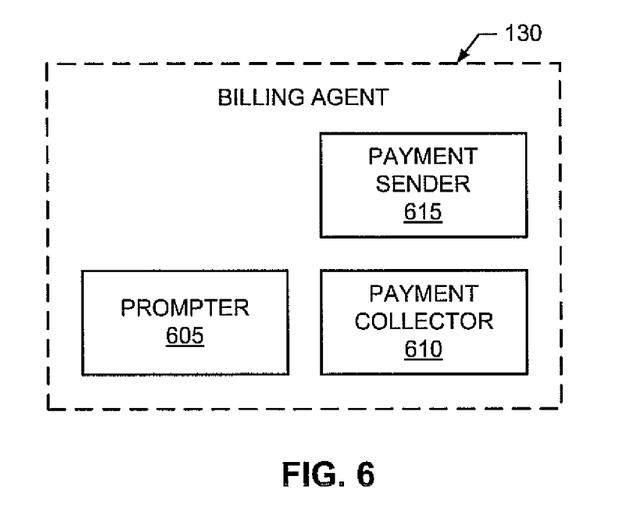
FIG. 6 illustrates an example manner of implementing any or all of the example billing agents of FIGS. 1 and 5.

FIG. 6 illustrates an example manner of implementing any or all of the example billing agents 130 of FIGS. 1 and 5. To prompt for alternative billing and/or payment information for a blocked VoIP communication session, the example billing agent 130 of FIG. 6 includes a prompter 605. The example prompter 605 of FIG. 6 provides one or more prompts to obtain payment and/or billing information from a calling party (i.e., to a current user of the VoIP user device 105 attempting to place the blocked call).

An example prompter 605 implements an interactive voice response system that provides one or more audible messages and/or signals that instruct and/or prompt the calling party to, for example, speak and/or press keys of a VoIP user device 105 that implements the billing agent 130 (and/or via keypad or keyboard coupled to the VoIP user device) to provide the alternative billing and/or payment information (e.g., a credit card number, a calling card number, and/or an account number). Another example prompter 605 provides one or more user interfaces (e.g., one or more web pages and/or text displays) that are displayed by and/or at the VoIP user device 105. Example user interfaces include, but are not limited to, one or more selectable and/or fillable items that the calling party uses to provide billing and/or payment information. For example, a text entry box may be provided for the calling party to enter a credit card number, a calling card number and/or an account number, and a button that completes the entry of billing and/or payment information. Such user interfaces may, additionally or alternatively, be displayed on a device that is communicatively and/or electrically coupled to the VoIP user device 105, for example, a personal computer and/or monitor. Persons of ordinary skill in the art will readily appreciate that the prompter 605 may implement any or all of these methods and/or apparatus to prompt a calling party for alternative billing and/or payment information.

To receive alternative billing and/or payment information from a user of the VoIP user device 105, the example billing agent 130 of FIG. 6 includes a payment collector 610. The example payment collector 610 of FIG. 6 can receive and/or obtain alternative billing and/or payment information via one or more different methods. In an example method, the payment collector 610 obtains the alternative billing and/or payment information via an interactive voice response system. In another example, the payment collector 610 obtains the alternative billing and/or payment information via one more values entered via one or more user interfaces provided by the example prompter 605.

To send alternative payment and/or billing information to an alternative billing server (e.g., any or all of the example alternative billing servers 125 of FIGS. 1-3), the example billing agent 130 of FIG. 6 includes a payment sender 615. The example payment sender 615 of FIG. 6 sends the alternative payment and/or billing information to the alternative billing server in any type of VoIP protocol message. An example data structure that may be used to implement an alternative billing and/or payment VoIP protocol message is described above in connection with FIG. 4.

While an example billing agent 130 is illustrated in FIG. 6, the example billing agent 130 may be implemented using any number and/or type(s) of other and/or additional logic, processors, devices, components, circuits, modules, interfaces, etc. Further, the logic, processors, devices, components, circuits, modules, elements, interfaces, etc. illustrated in FIG. 6 may be combined, divided, re-arranged, eliminated and/or implemented in any of a variety of ways. Additionally, the example billing agent 130 may be implemented as any combination of firmware, software, logic and/or hardware. For example, the example prompter 605, the example payment collector 610, the example payment sender 615 and/or, more generally, the example billing agent 130 may be implemented as coded instructions (e.g., the example coded instructions 530 and/or 535 of FIG. 5) executed by, for example, the example processor 525 of FIG. 5. Moreover, a billing agent 130 may include additional logic, processors, devices, components, circuits, interfaces and/or modules than those illustrated in FIG. 6 and/or may include more than one of any or all of the illustrated processors, devices, components, circuits, interfaces and/or modules.

Figure 7:
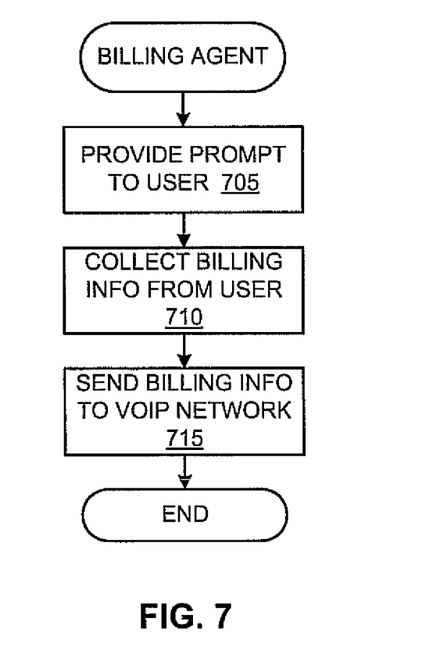
FIG. 7 is a flowchart representative of an example process that may be carried out to implement any or all of the example billing agents of FIGS. 1, 5 and 6.
Figure 8:
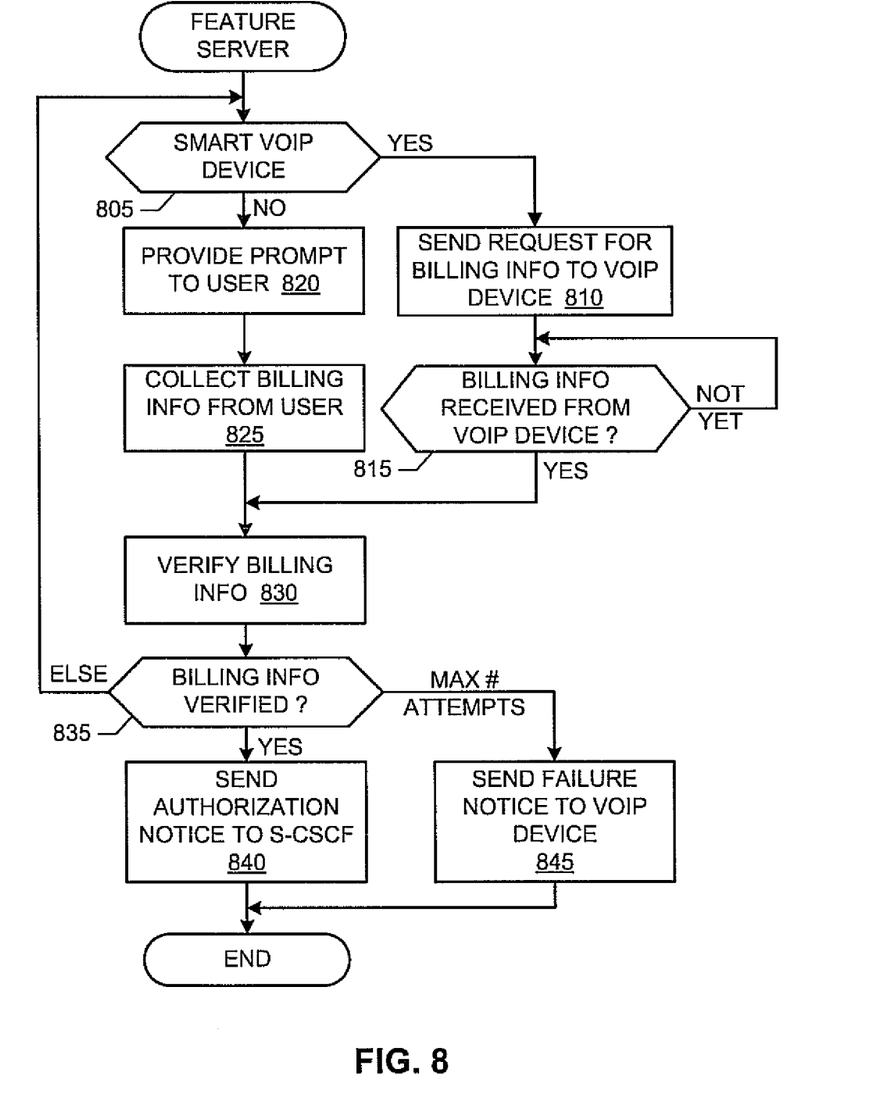
FIG. 8 is a flowchart representative of an example process that may be carried out to implement any or all of the example alternative billing call feature servers of FIGS. 1, 2 and 3.

FIG. 7 is a flowchart representative of an example process that may be carried out to implement any of the example billing agents 130 of FIGS. 1, 5 and 6. FIG. 8 is a flowchart representative of an example process that may be carried out to implement any of the example alternative billing servers 125 of FIGS. 1-3. The example processes of FIGS. 7 and/or 8 may be carried out by a processor, a controller and/or any other suitable processing device. For example, the example processes of FIGS. 7 and/or 8 may be embodied in coded instructions stored on a tangible medium such as a flash memory, a read-only memory (ROM) and/or random-access memory (RAM) associated with a processor (e.g., the example processor 525 discussed above in connection with FIG. 5, and/or the example processor 905 discussed below in connection with FIG. 9). Alternatively, some or all of the example processes of FIGS. 7 and/or 8 may be implemented using any combination(s) of ASIC(s), PLD(s), FPLD(s), discrete logic, hardware, firmware, etc. Also, some or all of the example processes of FIGS. 7 and/or 8 may be implemented manually or as any combination(s) of any of the foregoing techniques, for example, any combination of firmware, software, discrete logic and/or hardware. Further, although the example processes of FIGS. 7 and 8 are described with reference to the flowcharts of FIGS. 7 and 8, persons of ordinary skill in the art will readily appreciate that many other methods of implementing the example billing agents 130 of FIGS. 1-3, and/or the example alternative billing servers 125 of FIGS. 5-6 may be employed. For example, the order of execution of the blocks may be changed, and/or some of the blocks described may be changed, eliminated, sub-divided, or combined. Additionally, persons of ordinary skill in the art will appreciate that any or all of the example processes of FIGS. 7 and/or 8 may be carried out sequentially and/or carried out in parallel by, for example, separate processing threads, processors, devices, discrete logic, circuits, etc.

The example process of FIG. 7 begins when a billing agent (e.g., any of the example billing agents 130 of FIGS. 1, 5 and 6) receives a notification from an alternative billing server (e.g., any of the example alternative billing servers 125 of FIGS. 1-3). The billing agent (e.g., the example prompter 605 of FIG. 6) provides one or more prompts to a user of a VoIP user device (e.g., any of the example VoIP user devices 105 of FIGS. 1 and 5) that implements the billing agent (block 705). The prompter can provide the prompts using any type(s) of methods, such as an interactive voice response system and/or one or more user interfaces.

The billing agent (e.g., the example payment collector 610 of FIG. 6) collects the alternative billing and/or payment information from the user by, for example, collecting inputs received via an interactive voice response system and/or via one or more user interfaces (block 710).

The billing agent (e.g., the example payment sender 615 of FIG. 6) creates and sends a VoIP protocol message containing the collected alternative billing and/or payment information to the alternative billing server (block 715). A data structure that may be used to implement the VoIP protocol message is described above in connection with FIG. 4. The alternative billing and/or payment information may, in some examples, be encrypted before being sent to the alternative billing server. Control then exits from the example process of FIG. 7.

The example process of FIG. 8 begins when an alternative billing server (e.g., any of the example alternative billing servers 125 of FIGS. 1-3) receives notification that a VoIP communication session is being initiated to a blocked endpoint. The alternative billing server (e.g., the example prompter 305 of FIG. 3) determines if the VoIP user device (e.g., any of the example VoIP user devices 105 of FIGS. 1 and 5) is a VoIP user device capable of prompting the calling party (e.g., contains a billing agent 130) (block 805). If the VoIP user device is capable of prompting the calling party on behalf of the alternative billing server (block 805), the prompter sends a block call notification VoIP protocol message to the VoIP user device directing the VoIP user device to obtain alternative billing and/or payment information from the calling party (block 810). When billing and/or payment information is received from the VoIP user device (block 815), control proceeds to block 830 to verify the received alternative billing and/or payment information.

Returning block 805, if the VoIP user device is not capable of prompting the calling party on behalf of the alternative billing server (block 805), the prompter provides one or more prompts to a user of the VoIP user device via the VoIP user device (block 820). For example, the prompter implements an interactive voice response system that provides one or more audible messages and/or signals that prompt the user. The alternative billing server (e.g., the example payment collector 310 of FIG. 3) collects alternative billing and/or payment information provided and/or entered by the user (block 825). For example, the payment collector 310 receives user inputs via an interactive voice response system and/or from one or more user interfaces.

Continuing at block 830, the alternative billing server (e.g., the example payment verifier 315 of FIG. 3) verifies the received alternative billing and/or payment information (block 830). For example, the payment verifier sends the alternative billing and/or payment information to a credit card processing server to verify the information.

If the alternative billing and/or payment information is verified (block 835), the alternative billing server (e.g., the example service authorizer 320 of FIG. 3) sends a notification and/or indication to the S-CSCF handling the VoIP communication session (e.g., the example S-CSCF 205 of FIG. 2) notifying the S-CSCF that the VoIP communication session is now unblocked and, thus, can be established (block 840). Control then exits from the example process of FIG. 8.

If a maximum number of attempts to obtain valid alternative billing and/or payment information has occurred (block 835), the service authorizer sends a notice via the VoIP user device to the user (i.e., calling party) informing the user that the desired VoIP communication session is blocked (block 845). Control then exits from the example process of FIG. 8.

If the alternative billing and/or payment information is not verifiable and a maximum number of attempts has not been reached (block 835), control returns to block 805 to re-prompt the user to provide alternative billing and/or payment information.

Figure 9:
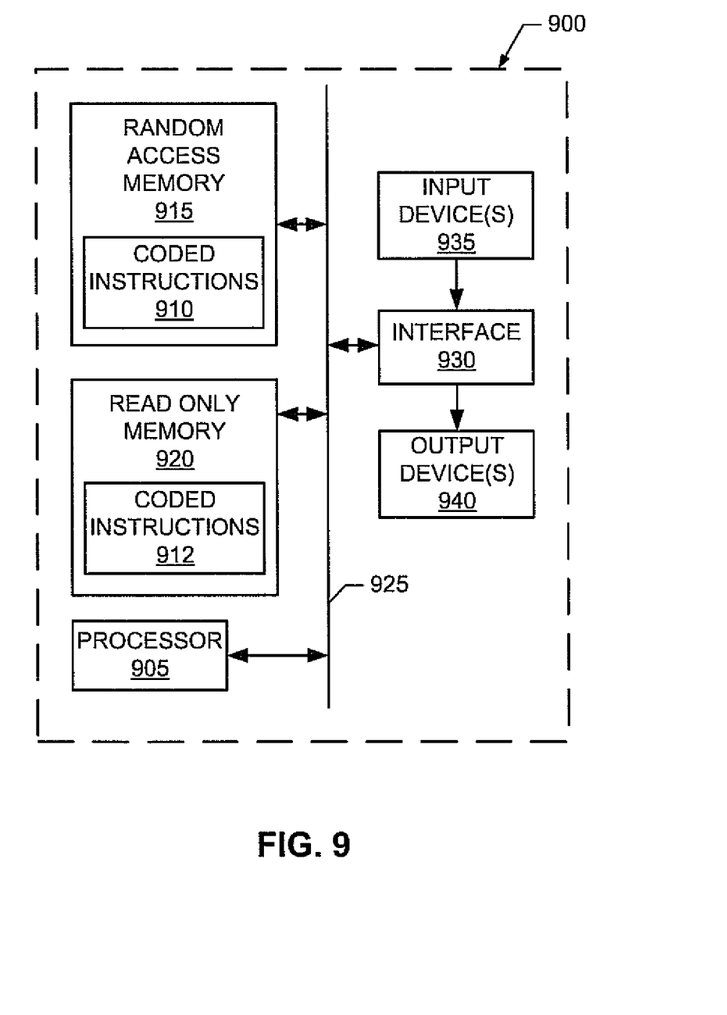
FIG. 9 is a schematic illustration of an example processor platform that may be used and/or programmed to carry out the example processes of FIGS. 7 and/or 8 to implement any or all of the example billing agents, and/or any or all of the example alternative billing call feature servers described herein.

FIG. 9 is a schematic diagram of an example processor platform 900 that may be used and/or programmed to implement all or a portion of the example VoIP user devices 105, the example billing agents 130, the example VoIP service provider network 115 and/or the example alternative billing servers 125 of FIGS. 1-3, 5 and 6. For example, the processor platform 900 can be implemented by one or more general purpose processors, processor cores, microcontrollers, etc.

The processor platform 900 of the example of FIG. 9 includes at least one general purpose programmable processor 905. The processor 905 executes coded instructions 910 and/or 912 present in main memory of the processor 905 (e.g., within a RAM 915 and/or a ROM 920). The processor 905 may be any type of processing unit, such as a processor core, a processor and/or a microcontroller. The processor 905 may execute, among other things, the example processes of FIGS. 7 and/or 8 to implement the example alternative billing servers 125 and/or the example billing agents 130 described herein. The processor 905 is in communication with the main memory (including a ROM 920 and/or the RAM 915) via a bus 925. The RAM 915 may be implemented by DRAM, SDRAM, and/or any other type of RAM device, and ROM may be implemented by flash memory and/or any other desired type of memory device. Access to the memory 915 and 920 maybe controlled by a memory controller (not shown). The RAM 915 may be used to store and/or implement, for example, one or more audible messages used by an interactive voice response system and/or one or more user interfaces.

The processor platform 900 also includes an interface circuit 930. The interface circuit 930 may be implemented by any type of interface standard, such as an external memory interface, serial port, general purpose input/output, etc. One or more input devices 935 and one or more output devices 940 are connected to the interface circuit 930. The input devices 935 and/or output devices 940 may be used to, for example, interfaces between the example alternative billing server 125 and other elements of the example VoIP service provider network 115 and/or the example VoIP user device 105.

Of course, persons of ordinary skill in the art will recognize that the order, size, and proportions of the memory illustrated in the example systems may vary. Additionally, although this patent discloses example systems including, among other components, software or firmware executed on hardware, it will be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, persons of ordinary skill in the art will readily appreciate that the above described examples are not the only way to implement such systems.

At least some of the above described example methods and/or apparatus are implemented by one or more software and/or firmware programs running on a computer processor. However, dedicated hardware implementations including, but not limited to, an ASIC, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a disk or tape); a magneto-optical or optical medium such as a disk; or a solid state medium such as a memory card or other package that houses one or more read-only (non-volatile) memories, random access memories, or other re-writable (volatile) memories; or a signal containing computer instructions. A digital file attachment to e-mail or other self-contained information archive or set of archives is considered a distribution medium equivalent to a tangible storage medium. Accordingly, the example software and/or firmware described herein can be stored on a tangible storage medium or distribution medium such as those described above or equivalents and successor media.

To the extent the above specification describes example components and functions with reference to particular devices, standards and/or protocols, it is understood that the teachings of the invention are not limited to such devices, standards and/or protocols. Such systems are periodically superseded by faster or more efficient systems having the same general purpose. Accordingly, replacement devices, standards and/or protocols having the same general functions are equivalents which are intended to be included within the scope of the accompanying claims.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method comprising:
at a voice over Internet Protocol user device, receiving a request from a calling party to place a call to a destination of a voice over Internet Protocol service provider network, the network configured to not automatically establish calls to the destination from the voice over Internet Protocol device;
based on a determination by a billing server whether the voice over Internet Protocol user device is a smart voice over Internet Protocol device capable of prompting the calling party on behalf of the billing server, receiving from a call session control function server in the service provider network an indication that a call placed from the voice over Internet Protocol user device is blocked and one of A) receiving an instruction to be executed to cause a billing agent of the voice over Internet Protocol user device to prompt for billing information from the calling party when the voice over Internet Protocol user device is a smart voice over Internet Protocol device capable of prompting the calling party on behalf of the billing server and B) receiving a call to the voice over Internet Protocol user device to collect billing information from the calling party when the voice over Internet Protocol user device is not the smart voice over Internet Protocol device capable of prompting the calling party on behalf of the billing server;

sending a voice over Internet Protocol protocol message containing the billing information received from the calling party at the voice over Internet Protocol user device to the billing server, financial responsibility for the call to be changed by the billing server from an owner of the voice over Internet Protocol user device, an operator of the voice over Internet Protocol user device, or a lessee of the voice over Internet Protocol user device to a new responsible party based on the billing information received from the calling party, the calling party being different from the owner of the voice over Internet Protocol user device, the operator of the voice over Internet Protocol user device, and the lessee of the voice over Internet Protocol user device; and establishing the call when the call session control function server receives an indication that the call is unblocked.

2. A method as defined in claim 1, further comprising encrypting the billing information.

3. A method as defined in claim 1, wherein receiving the indication comprises receiving a second voice over Internet Protocol protocol message.

4. A method as defined in claim 1, wherein prompting for the billing information comprises presenting an interface at the voice over Internet Protocol user device to prompt for the billing information.

5. A method as defined in claim 4, wherein the interface is presented on a computer communicatively coupled to the voice over Internet Protocol user device.

6. A method as defined in claim 4, wherein the interface is implemented by the voice over Internet Protocol user device.

7. A method as defined in claim 6, wherein presenting the interface comprises providing a user interface that includes a selectable element to provide the billing information.

8. A method as defined in claim 6, wherein presenting the interface comprises providing an audible message that includes an indication of a keypad button to press to provide the billing information.

9. A method as defined in claim 4, wherein the interface is presented when the indication is received.

10. A method as defined in claim 1, further comprising receiving the indication that the call is unblocked at the voice over Internet Protocol device when the billing information is authenticated at the billing server.

11. A method as defined in claim 1, wherein the voice over Internet Protocol protocol message is a session initiation protocol INFO message or a session initiation protocol OPTION message.

12. A method as defined in claim 1, wherein the responsible party is a requester of the call, the requester being different from the owner of the voice over Internet Protocol user device, the operator of the voice over Internet Protocol user device, and the lessee of the voice over Internet Protocol user device based on the billing information.

13. A voice over Internet Protocol user device comprising:
a processor;
an input device to receive a request from a calling party to place a call to a destination of a voice over Internet Protocol service provider network, the network configured to not automatically establish calls to the destination from the voice over Internet Protocol device; and a network interface to:
based on a determination by a billing server that the voice over Internet Protocol user device is a smart voice over Internet Protocol device capable of prompting the calling party on behalf of the billing server, receive an indication from a call server in the service provider network that an initiated voice over Internet protocol session comprising the call is blocked, and receive an instruction to be executed to cause a billing agent of the voice over Internet Protocol user device to prompt for billing information from the calling party when the voice over Internet Protocol user device is a smart voice over Internet Protocol device capable of prompting the calling party on behalf of the billing server and receive a call to the voice over Internet Protocol user device to collect billing information from the calling party when the voice over Internet Protocol user device is not a smart voice over Internet Protocol device capable of prompting the calling party on behalf of the billing server;

send the billing information received from the calling party to the billing server; and establish the voice over Internet protocol session when the call server receives an indication that the call is unblocked, financial responsibility for the call to be changed by the billing server from an owner of the voice over Internet Protocol user device, an operator of the voice over Internet Protocol user device, or a lessee of the voice over Internet Protocol user device to a responsible billing account based on the billing information received from the calling party, the calling party being different from the owner of the voice over Internet Protocol user device, the operator of the voice over Internet Protocol user device, and the lessee of the voice over Internet Protocol user device.

14. A voice over Internet Protocol user device as defined in claim 13, further comprising the billing agent, the billing agent including:
a prompter to present the prompt;
a payment collector to collect the billing information; and
a payment sender to send the billing information to the billing server via the network interface.

15. A voice over Internet Protocol user device as defined in claim 14, wherein the billing agent comprises an interactive voice response system to present the prompt and to receive the billing information.

16. A voice over Internet Protocol user device as defined in claim 13, wherein the prompt comprises a user interface that includes a selectable element to provide the billing information.

17. A voice over Internet Protocol user device as defined in claim 13, wherein the prompt comprises a web site presented on a display.

18. A voice over Internet Protocol user device as defined in claim 13, wherein the network interface is to send the billing information to the billing server in a voice over Internet Protocol protocol message.

19. A voice over Internet Protocol user device as defined in claim 13, wherein the network interface is to receive an unblocked indication when the billing information is authenticated.

20. A voice over Internet Protocol user device as defined in claim 13, wherein the billing server is a feature server of the network.

21. A voice over Internet Protocol user device as defined in claim 13, wherein the voice over Internet Protocol user device is at least one of a voice over Internet Protocol phone, a voice over Internet Protocol residential gateway, a personal computer, a voice over Internet Protocol user device or a voice over Internet Protocol adapter.

22. A storage device comprising machine readable instructions which, when executed, cause a voice over Internet Protocol user device to at least:

identify a request from a calling party to place a call to a destination of a voice over Internet Protocol service provider network, the network configured to not automatically establish calls to the destination from the voice over Internet Protocol device;

based on a determination by a billing server that the voice over Internet Protocol user device is a smart voice over Internet Protocol device capable of prompting the calling party on behalf of the billing server, and in response to an indication from a call server in a service provider network that call placed from the voice over Internet Protocol user device is blocked, one of:

A) when the voice over Internet Protocol user device is a smart voice over Internet Protocol device capable of prompting the calling party on behalf of the billing server, execute an instruction received from the billing server to cause a billing agent of the voice over Internet Protocol user device to prompt for billing information from the calling party; and B) when the voice over Internet Protocol user device is not the smart voice over Internet Protocol device capable of prompting the calling party on behalf of the billing server, answer a call to the voice over Internet Protocol user device to collect billing information from the calling party;

send a voice over Internet Protocol protocol message containing the billing information received from the calling party at the voice over Internet Protocol user device to the billing server, financial responsibility for the call to be changed by the billing server from an owner of the voice over Internet Protocol user device, an operator of the voice over Internet Protocol user device, or a lessee of the voice over Internet Protocol user device to a new responsible party based on the billing information received from the calling party, the calling party being different from the owner of the voice over Internet Protocol user device, the operator of the voice over Internet Protocol user device, and the lessee of the voice over Internet Protocol user device; and establish the call when the call server receives an indication that the call is unblocked.

23. A storage device as defined in claim 22, wherein the machine readable instructions, when executed, further cause the voice over Internet Protocol user device to at least encrypt the billing information.

24. A storage device as defined in claim 22, wherein the indication comprises a second voice over Internet Protocol protocol message.

25. A storage device as defined in claim 22, wherein the machine readable instructions, when executed, further cause the voice over Internet Protocol user device to at least present an interface at the voice over Internet Protocol user device to prompt for the billing information.

26. A storage device as defined in claim 25, wherein the machine readable instructions, when executed, further cause the voice over Internet Protocol user device to at least present the interface on a computer communicatively coupled to the voice over Internet Protocol user device.

27. A storage device as defined in claim 25, wherein the machine readable instructions, when executed, further cause the voice over Internet Protocol user device to at least present the interface by providing a user interface that includes a selectable element to provide the billing information.

28. A storage device as defined in claim 25, wherein the machine readable instructions, when executed, further cause the voice over Internet Protocol user device to at least present the interface by providing an audible message that includes an indication of a keypad button to press to provide the billing information.

29. A storage device as defined in claim 25, wherein the machine readable instructions, when executed, further cause the voice over Internet Protocol user device to at least present the interface when the indication is received.

* * * * *